(12) United States Patent
Xiang et al.

(10) Patent No.: US 10,745,870 B2
(45) Date of Patent: Aug. 18, 2020

(54) SPEED BUMP AND SPEED BUMP SYSTEM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Desheng Xiang, Beijing (CN); Dawei Wang, Beijing (CN); Chao Yu, Beijing (CN); Gang Liu, Beijing (CN); Cuie Wang, Beijing (CN); Shuainan Liu, Beijing (CN); Jiaqiang Wang, Beijing (CN); Yajun Guo, Beijing (CN); Dong Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 28 days.

(21) Appl. No.: 16/019,128

(22) Filed: Jun. 26, 2018

(65) Prior Publication Data
US 2019/0203435 A1    Jul. 4, 2019

(30) Foreign Application Priority Data
Jan. 2, 2018  (CN) .......................... 2018 1 0002774

(51) Int. Cl.
*E01F 11/00*    (2006.01)
*E01F 9/529*    (2016.01)
(Continued)

(52) U.S. Cl.
CPC ................ *E01F 9/529* (2016.02); *E01F 9/30* (2016.02); *E01F 9/571* (2016.02); *F03G 1/02* (2013.01);
(Continued)

(58) Field of Classification Search
CPC ....................................................... E01F 9/529
(Continued)

(56) References Cited

U.S. PATENT DOCUMENTS 1,916,873 A * 7/1933 Wiggins .................... F03G 7/08
                                                                    185/39
3,964,264 A * 6/1976 Tornabene ............ F03B 13/186
                                                                    405/76
(Continued)

FOREIGN PATENT DOCUMENTS

CN          203229881 U     10/2013
CN          103707807 A      4/2014
(Continued)

OTHER PUBLICATIONS

First Office Action for CN Appl. No. 201810002774.6, dated Sep. 16, 2019.

*Primary Examiner* — Thomas B Will
*Assistant Examiner* — Katherine J Chu
(74) *Attorney, Agent, or Firm* — Dinsmore & Shohl LLP (57) ABSTRACT

A speed bump and a speed bump transportation system are provided. The speed bump comprises: a base; a cover disposed opposite to the base and configured to be movable relative to the base; an electric-power generation device associated with the cover to scavenge energy through the cover and convert the energy into electrical energy; a first detection device for detecting a force condition of the cover and sending a first detection signal to a communication device when the cover is pressed; the communication device electrically connected to the first detection device and for sending a first communication signal when receiving the first detection signal, wherein the electric-power generation device is electrically connected to the communication device and the first detection device respectively to supply electric- (Continued)

power to the communication device and the first detection device.

12 Claims, 6 Drawing Sheets

(51) Int. Cl.

| | | |
|---|---|---|
| *E01F 9/30* | (2016.01) | |
| *E01F 9/571* | (2016.01) | |
| *F03G 1/02* | (2006.01) | |
| *F16H 31/00* | (2006.01) | |
| *F16H 19/04* | (2006.01) | |
| *G09F 7/00* | (2006.01) | |
| *H02K 7/18* | (2006.01) | |
| *G08G 1/09* | (2006.01) | |
| *F16H 25/22* | (2006.01) | |

(52) U.S. Cl.
CPC ......... *F16H 19/04* (2013.01); *F16H 25/2204* (2013.01); *F16H 31/001* (2013.01); *G08G 1/09* (2013.01); *G08G 1/093* (2013.01); *G09F 7/00* (2013.01); *H02K 7/1853* (2013.01); *G09F 2007/005* (2013.01); *Y02D 70/00* (2018.01); *Y02D 70/40* (2018.01)

(58) Field of Classification Search
USPC .......................................................... 404/71
See application file for complete search history.

(56) References Cited

U.S. PATENT DOCUMENTS

| | | | | |
|---|---|---|---|---|
| 4,004,422 A * | 1/1977 | Le Van | ...................... | F03G 7/08 60/533 |
| 4,239,975 A * | 12/1980 | Chiappetti | ................. | F03G 7/08 290/1 R |
| 4,250,395 A * | 2/1981 | Lundgren | ............. | H02K 7/1853 290/1 R |
| 6,457,900 B2 | 10/2002 | Bond | | |
| 7,371,030 B2 * | 5/2008 | Hickman | ................... | E01C 9/00 14/73 |
| 7,541,684 B1 * | 6/2009 | Valentino | ................... | H02J 7/02 290/1 R |
| 7,774,984 B2 * | 8/2010 | Hsu | ...................... | E05F 1/1041 185/40 R |
| 8,123,431 B2 * | 2/2012 | Chen | ......................... | E01C 9/00 290/1 R |
| 8,164,204 B2 * | 4/2012 | Jang | ......................... | F03B 13/00 290/1 R |
| 8,186,905 B2 * | 5/2012 | Castro | ..................... | E01F 15/00 404/6 |
| 8,330,282 B2 * | 12/2012 | Niioka | ....................... | F03G 7/10 290/1 C |
| 8,754,539 B2 * | 6/2014 | Black | ....................... | F04B 35/00 290/1 R |
| 8,786,115 B2 * | 7/2014 | Tort-Ortiz | ............ | H02K 7/1861 290/1 R |
| 8,907,202 B1 * | 12/2014 | Brusaw | ............... | H01L 31/0488 136/244 |
| 8,928,160 B2 * | 1/2015 | Jang | ........................ | F03G 7/08 290/1 R |
| 9,006,916 B2 * | 4/2015 | Chiu | ...................... | F16H 21/16 290/1 R |
| 9,099,899 B2 * | 8/2015 | Tort | ..................... | H02K 7/1861 |
| 9,287,753 B2 * | 3/2016 | Jang | ......................... | F03G 7/08 |
| 10,056,804 B2 * | 8/2018 | Vanelli Tagliacani | ... | H02K 7/06 |
| 2002/0089309 A1 * | 7/2002 | Kenney | ................ | H02K 7/1853 322/1 |
| 2004/0042852 A1 * | 3/2004 | Alperon | .................... | E01C 9/00 404/71 |
| 2004/0160058 A1 * | 8/2004 | Gott | ......................... | F03G 7/08 290/1 R |
| 2005/0232694 A1 * | 10/2005 | Fitzgibbon | ......... | G07C 9/00182 404/6 |
| 2006/0147263 A1 * | 7/2006 | Hughes | ................. | E01F 13/123 404/71 |
| 2006/0204328 A1 * | 9/2006 | Frey | ....................... | E01F 9/688 404/9 |
| 2007/0020047 A1 * | 1/2007 | Adair | ..................... | E01F 11/00 404/71 |
| 2007/0201950 A1 * | 8/2007 | Rastegar | ................. | E01C 9/007 404/71 |
| 2007/0264081 A1 * | 11/2007 | Chiu | ........................ | E01C 9/00 404/71 |
| 2010/0072758 A1 * | 3/2010 | Chang | .................. | H02K 7/1853 290/1 R |
| 2010/0133855 A1 * | 6/2010 | Daya | ........................ | F03G 7/08 290/1 R |
| 2010/0196092 A1 * | 8/2010 | Castro | ..................... | E01F 15/00 404/6 |
| 2010/0202829 A1 * | 8/2010 | Gelfand | .................. | E01F 13/12 404/6 |
| 2010/0288074 A1 * | 11/2010 | Becerra | ..................... | F03G 7/08 74/572.1 |
| 2011/0215593 A1 * | 9/2011 | Chang | .................... | H02K 99/00 290/1 R |
| 2012/0286522 A1 * | 11/2012 | Stahlkopf | ............... | F01K 13/02 290/1 R |
| 2013/0216305 A1 * | 8/2013 | Wallinder | ............... | E01F 9/529 404/15 |
| 2014/0163836 A1 | 6/2014 | Um et al. | | |
| 2015/0252540 A1 * | 9/2015 | Lee | ....................... | E01F 13/123 404/6 |
| 2017/0081814 A1 * | 3/2017 | Zwerneman | ............ | E01F 9/529 |
| 2018/0266061 A1 * | 9/2018 | Wu | .......................... | E01F 9/529 |
| 2019/0139413 A1 * | 5/2019 | Austin | ..................... | G08G 1/07 |

FOREIGN PATENT DOCUMENTS

| | | |
|---|---|---|
| CN | 104264603 A | 1/2015 |
| CN | 105134520 A | 12/2015 |
| CN | 105370522 A | 3/2016 |
| CN | 205116048 U | 3/2016 |
| CN | 205329572 U | 6/2016 |
| CN | 205399254 U | 7/2016 |
| CN | 105862616 A | 8/2016 |
| CN | 106012905 A | 10/2016 |
| CN | 106194622 A | 12/2016 |
| WO | WO-2019046816 A1 * | 3/2019 ............. E01F 9/529 |

* cited by examiner

SPEED BUMP AND SPEED BUMP SYSTEM

CROSS-REFERENCE TO RELATED APPLICATIONS

This application claims priority to Chinese Patent Application No. 201810002774.6 that was filed on Jan. 2, 2018, the disclosure of which is entirely incorporated herein by reference.

FIELD

The present disclosure relates to a speed bump and a speed bump system.

BACKGROUND

In the related arts, in order to reduce the traveling speed of vehicles, ensure the safety of lives, and avoid occurrence of traffic accidents, a speed bump, which may also be termed as speed hump or decelerate bump/hump or the like, is provided on the road. When the vehicle passes the speed bump at a higher speed, violent vibrations are transmitted from the wheel to the driver via the vehicle body and the seat. In order to reduce the vibrations of the vehicle and the damages to the tire and the suspension system, the driver may have to brake so as to slowly pass the speed bumps. Thus, deceleration can be achieved.

SUMMARY

According to some embodiments of the present disclosure, there is provided a system comprising a speed bump. The speed bump comprises: a base; a cover disposed opposite to the base and configured to be movable relative to the base; an electric-power generation device associated with the cover to scavenge energy through the cover and convert the energy into electrical energy; a first detection device for detecting a force condition of the cover and sending a first detection signal to a communication device when the cover is pressed; the communication device electrically connected to the first detection device and for sending a first communication signal when receiving the first detection signal, wherein the electric-power generation device is electrically connected to the communication device and the first detection device respectively to supply electric-power to the communication device and the first detection device.

According to the speed bumps and systems of the embodiments of the present disclosure, the electric-power generation device converts the kinetic energy and potential energy originated from the vehicle driving through the speed bump into electrical energy to supply electric power to the first detection device and the communication device. In addition, when the first detection device detects that the cover is subjected to a downward press (i.e., when the vehicle passes the speed bump), the first detection device sends a first detection signal to the communication device. In this way, the communication device can send the first communication signal upon receiving the first detection signal to communicate with the vehicles located near the speed bump, so that the vehicles can send warning information after receiving the first communication signal to warn the driver of the position of the speed bump and warn the driver slow down, to prevent the driver from neglecting the speed bump due to negligence or being obstructed so that the vehicle passes through the speed bump at a reduced speed. Thereby, the experience of the bumpiness can be improved, and the driving safety can be ensured. In addition, a first communication signal can also be sent to the warning device which is capable of communicating with the communication device, so that the warning device can issue an warning information upon receiving the first communication signal, to warn the vehicles coming from both sides of the road and the corner so as to reduce traffic accidents caused by driver's visual blind spots.

In some embodiments, the communication device comprises a wireless transceiver for transmitting the first communication signal.

In some embodiments, the wireless transceiver is adapted for one of the following: sending one piece of the first communication signal; sending, simultaneously, a plurality of the first communication signals; or sending a plurality of the first communication signals in sequence.

In some embodiments, the system further comprises a first warning device disposed outside the speed bump, the first warning device issuing a first warning information upon receipt of the first communication signal.

In some embodiments, the speed bump further comprises a second detection device and a second warning device, wherein the second detection device is configured to detect a brightness of ambient light and send a second detection signal to the communication device when the brightness is below a threshold, and wherein the communication device controls the second warning device to issue a second warning information when receiving the second detection signal.

The electric-power generation device can also be electrically connected to the second detection device and the second warning device respectively to supply electric-power thereto.

In some embodiments, the electric-power generation device comprises:

a first transmission mechanism comprising a moving member and a rotating member, the moving member being coupled to the cover, the rotating member being rotatably disposed on the base, and the moving member being mated with the rotating member to convert a displacing movement of the moving member into a rotational movement of the rotating member;

a second transmission mechanism comprising:
  a power input member coupled to the rotating member;
  a transmission shaft rotatably disposed on the base;
  a first overrun clutch disposed between the power input member and the transmission shaft, and coupling the power input member and the transmission shaft when the transmission shaft is rotated in a first direction;
  a power output member; and
  a second overrun clutch disposed between the power output member and the transmission shaft, and coupling the power output member and the transmission shaft when the transmission shaft is rotated in a second direction;

an energy storage member coupled to the transmission shaft, and storing energy when the transmission shaft is rotated in the first direction and releasing energy when the transmission shaft is rotated in the second direction; and an electric-power generator coupled to the power output member.

In some embodiments, the energy storage member is a scroll spring, when the scroll spring reaches a maximum tightened state, the first overrun clutch automatically decouples the power input member and the transmission shaft, and the second overrun clutch automatically couples the power output member and the transmission shaft.

In some embodiments, the first transmission mechanism is a ball-screw transmission mechanism comprising a screw rod, a nut, and a ball, wherein the screw rod is configured to drive the nut by a screw thread, wherein the screw rod functions as the moving member and the nut functions as the rotating member.

In some embodiments, the power input member is a first straight gear, and an outer wall of the rotating member is provided with a gear tooth portion which is meshed with the first straight gear through a second straight gear pivotally coupled to the base; the power output member is a bevel gear transmission group comprising a first bevel gear and a second bevel gear meshed with each other, the first bevel gear and the transmission shaft are capable of being coupled by the second overrun clutch, and the second bevel gear is coupled to the electric-power generator.

In some embodiments, the electric-power generation device comprises: a first transmission mechanism comprising a moving member and a rotating member, the moving member being coupled to the cover, the rotating member being rotatably disposed on the base, and the moving member being mated with the rotating member to convert a displacing movement of the moving member into a rotational movement of the rotating member; a power output member which is rotatable and mated with the rotating member; and an electric-power generator coupled to the power output member.

In some embodiments, the first transmission mechanism is a ball screw transmission mechanism comprising a screw rod, a nut, and a ball, wherein the screw rod is configured to drive the nut by a screw thread, the screw rod functions as the moving member, and the nut functions as the rotating member.

In some embodiments, the power output member is a third straight gear, an outer wall of the rotating member is provided with a gear tooth portion which is meshed with the third straight gear. According to some embodiments, there is provide a speed bump comprising: a base; a cover disposed opposite to the base and configured to be movable relative to the base; an electric-power generation device associated with the cover to scavenge energy through the cover and convert the energy into electrical energy.

The electric-power generation device comprises:
  a first transmission mechanism comprising a moving member and a rotating member, the moving member being coupled to the cover, the rotating member being rotatably disposed on the base, and the moving member being mated with the rotating member to convert a displacing movement of the moving member into a rotational movement of the rotating member;
  a second transmission mechanism comprising:
    a power input member coupled to the rotating member;
    a transmission shaft rotatably disposed on the base;
    a first overrun clutch disposed between the power input member and the transmission shaft, and coupling the power input member and the transmission shaft when the transmission shaft is rotated in a first direction;
    a power output member; and
    a second overrun clutch disposed between the power output member and the transmission shaft, and coupling the power output member and the transmission shaft when the transmission shaft is rotated in a second direction;
  an energy storage member coupled to the transmission shaft and storing energy when the transmission shaft is rotated in the first direction and releasing energy when the transmission shaft is rotated in the second direction; and
  an electric-power generator coupled to the power output member.

In some embodiments, the energy storage member is a scroll spring, and when the scroll spring reaches a maximum tightened state, the first overrun clutch automatically discouples the power input member and the transmission shaft, and the second overrun clutch automatically couples the power output member and the transmission shaft.

In some embodiments, the first transmission mechanism is a ball-screw transmission mechanism comprising a screw rod, a nut, and a ball, wherein the screw rod is configured to drive the nut by a screw thread, wherein the screw rod functions as the moving member and the nut functions as the rotating member.

In some embodiments, the power input member is a first straight gear, and an outer wall of the rotating member is provided with a gear tooth portion which is meshed with the first straight gear through a second straight gear pivotally coupled to the base; and the power output member is a bevel gear transmission group comprising a first bevel gear and a second bevel gear meshed with each other, the first bevel gear and the transmission shaft are capable of being coupled by the second overrun clutch, and the second bevel gear is coupled to the electric-power generator.

In some embodiments, the speed bump further comprises a reset member coupled between the cover and the base and configured to reset the cover to a position away from the base.

According to some embodiments, there is provide a speed bump comprising: a base; a cover disposed opposite to the base and configured to be movable relative to the base; an electric-power generation device associated with the cover to scavenge energy through the cover and convert the energy into electrical energy. The electric-power generation device comprises: a first transmission mechanism comprising a moving member and a rotating member, the moving member being coupled to the cover, the rotating member being rotatably disposed on the base, and the moving member being mated with the rotating member to convert a displacing movement of the moving member into a rotational movement of the rotating member; a power output member which is rotatable and mated with the rotating member; and an electric-power generator coupled to the power output member.

In some embodiments, the first transmission mechanism is a ball screw transmission mechanism comprising a screw rod, a nut, and a ball, wherein the screw rod is configured to drive the nut by a screw thread, the screw rod functions as the moving member, and the nut functions as the rotating member.

In some embodiments, the power output member is a third straight gear, an outer wall of the rotating member is provided with a gear tooth portion which is meshed with the third straight gear.

Additional aspects and advantages of the present disclosure will be described in part in the description below, and in part will be obvious from the description, or may be learned by practice of the present disclosure.

BRIEF DESCRIPTION OF DRAWINGS

The above and/or additional aspects and advantages of the present disclosure will become apparent and easily understood from the following description of embodiments in conjunction with the accompanying drawings, in which.

DETAILED DESCRIPTION OF EMBODIMENTS

The embodiments of the present disclosure will be described in detail below, and examples of the embodiments are illustrated in the drawings, throughout which the like or similar reference numerals are used to denote the like or similar elements or the elements having the like or similar functions. The embodiments described below with reference to the accompanying drawings are exemplary, are used only for explaining the principles of the present disclosure, and shall not be construed as limiting the present disclosure.

The inventors of the present application recognize that in driving, due to the driver may inadvertently lose sight of the speed bump or be obstructed from view of the speed bump, it is often too late for the driver to decelerate before passing over speed bump, which not only affects the ride comfort of the driver, but also is unfavorable for traffic safety and vehicle maintenance. Therefore, it may be advantageous to implement a function of pre-warning of the speed bump and warning the driver to decelerate so as to ensure the safety of pedestrians and vehicles.

In addition, traffic accidents may be particularly prone to take place at road intersections. This is mainly because the driver has visual blind spots in driving, and it is difficult to predict whether there are the vehicles coming from both sides of the road. Therefore, it may be advantageous to pre-warn the drivers of the vehicles come from both sides of the intersection, so as to reduce the probability of accidents.

Based on these, speed bumps and systems as described in the present disclosure are proposed. Speed bumps and systems according to the embodiments of the present disclosure will be described below with reference to FIGS. 1 to 8.

Figure 1:
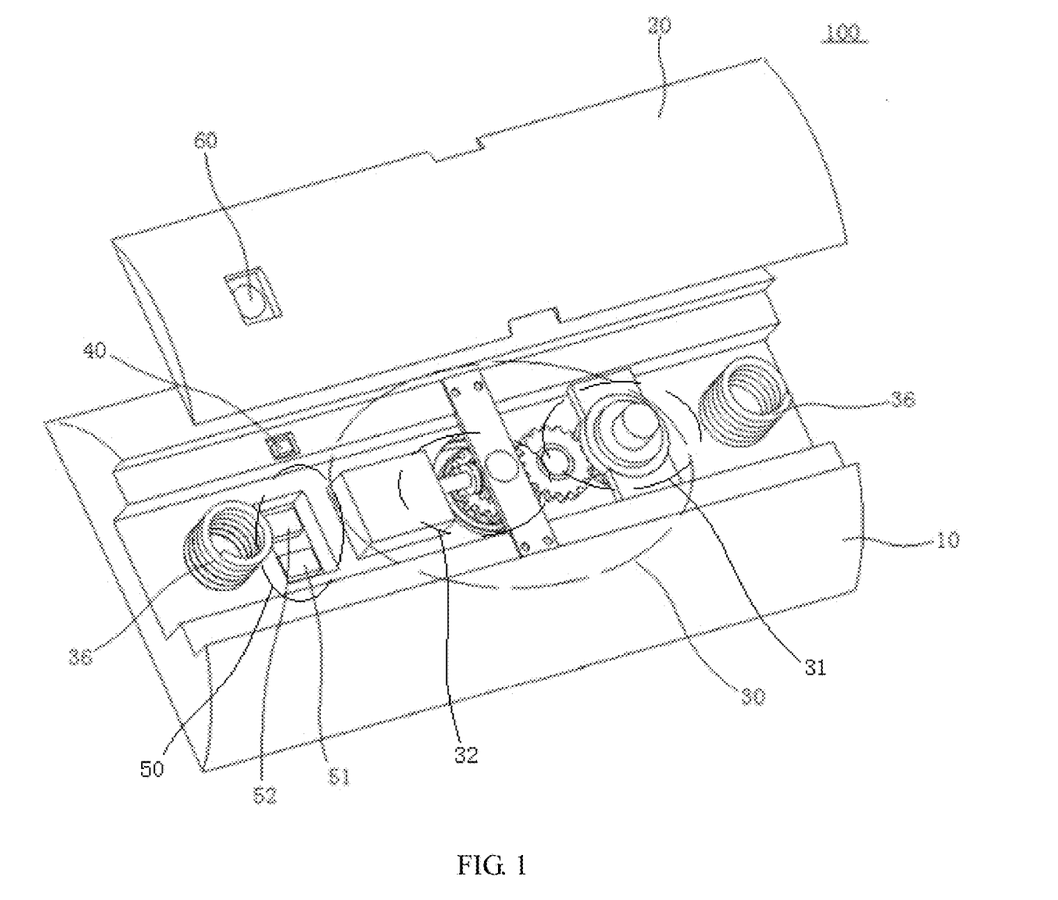
FIG. 1 is an exploded perspective view of a speed bump according to some embodiments of the present disclosure.
Figure 2:
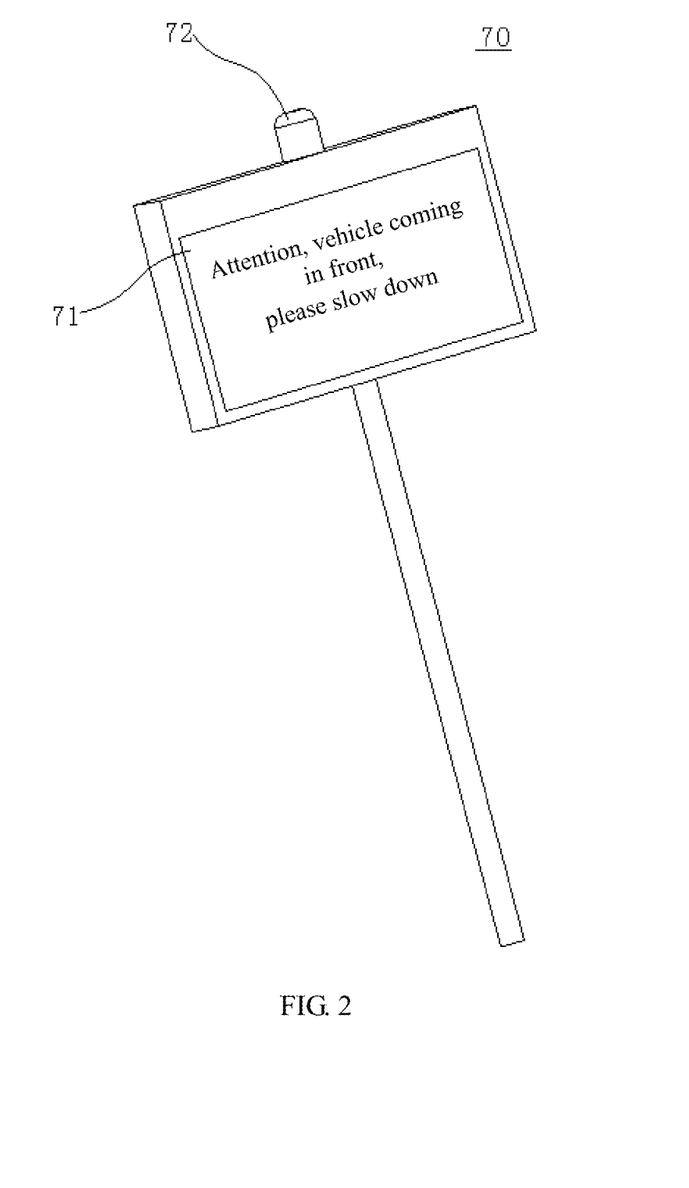
FIG. 2 is a schematic diagram of a warning board according to some embodiments of the present disclosure.

As shown in FIGS. 1 and 2, a system according to some embodiments of the present disclosure may include a speed bump 100. The speed bump 100 may include a base 10, a cover 20, an electric-power generation device 30, a first detection device 40, and a communication device 50.

The cover 20 is disposed opposite to the base and is configured to be movable relative to the base. For example, the cover 20 is disposed above the base 10 and is retractable.

The electric-power generation device 30 is coupled to the cover 20 to scavenge energy through the cover 20 to convert the energy into electrical energy. The first detection device 40 is used to detect the force condition of the cover 20 and send a first detection signal to the communication device 50 when the cover 20 is pressed. The electric-power generation device 30 is electrically connected to the communication device 50 and the first detection device 40, respectively, to supply electric power to the communication device 50 and the detection device 40. The communication device 50 is electrically connected to the first detection device 40, and transmits a first communication signal when the first detection signal is received.

According to the speed bump 100 of the embodiment of the present disclosure, the electric-power generation device 30 can convert the kinetic energy and potential energy originated from the vehicle driving through the speed bump 100 into electrical energy, which can be stored, to supply power to the first detection device 40, the communication device 50, and the like. In addition, when the first detection device 40 detects that the cover 20 is pressed down (that is, when the vehicle passes the speed bump 100), the first detection device 40 issues a first detection signal to the communication device 50.

In this way, the communication device 50 can send or transmit a first communication signal upon receiving the first detection signal to communicate with a vehicle located near the speed bump 100 so that the vehicle can send warning information, upon receiving the first communication signal, to warn the driver of the vehicle located near the speed bump 100 of the position of the speed bump 100 and warn the driver to decelerate, in case that the driver inadvertently skips or overlooks the speed bump 100 or is obstructed from seeing the speed bump 100, so that the vehicle can pass through the speed bump 100 at a reduced speed, thereby reducing the experience of bumpiness and ensuring the drive safety. In addition, a first communication signal may also be sent or transmit to a warning device capable of communicating with the communication device 50 so that the warning device can send warning information upon receiving the first communication signal to warn the vehicles coming from both sides of the road and corners, so as to reduce traffic accidents caused by driver's visual blind spots.

According to some embodiments of the present disclosure, the communication device 50 comprises a wireless transceiver 51 that can be used to transmit a first communication signal. That is, the communication device 50 can communicate with a corresponding signal receiving device. The signal receiving device may be integrated in the vehicle, or it may be a warning board 70 that is placed independently of the speed bump 100.

Thus, the wireless transceiver 51 can send a signal to the vehicle and the external warning device that are within a certain range from the speed bump 100. The speed bumps according to the embodiments of the present disclosure have a simple structure. In addition, the external warning device and the speed bump 100 do not need to be coupled by a cable, that is, the external warning device can be communicated wirelessly with the speed bump 100, and can be arranged within a certain distance from the speed bump 100, and such an arrangement is more convenient and versatile.

Further, in some embodiments, the wireless transceiver 51 may be adapted to issue one first communication signal at a time. In some implementations, the communication device 50 comprises a controller 52 and a wireless transceiver 51. The controller 52 may control the wireless transceiver 51 to send one first communication signal after receiving the first detection signal. One or more external receiving devices can receive the first communication signal. In some specific implementations, the first communication signal may be an electromagnetic wave, and the wireless transceiver 51 may send electromagnetic waves at a preset frequency to external receiving device(s).

In other embodiments, the wireless transceiver 51 can simultaneously send multiple first communication signals. In other words, the wireless transceiver 51 can simultaneously send a plurality of first communication signals to a plurality of external receiving devices. The frequencies of the plurality of first communication signals may be different. As a result, one-to-one communication between the communication device 50 and a plurality of external devices is realized, which improves the accuracy and reliability of the communications.

Of course, the present disclosure shall not be limited thereto. In other embodiments, the wireless transceiver 51 can also sequentially send a plurality of first communication signals. In some specific implementations, when the signals that a plurality of external receiving devices (the receiving devices can be integrated in different external warning devices) can receive have different types, for example, have different frequency ranges, the wireless transceiver 51 can be controlled by the controller 52 to send different types of the first communication signal in sequence. A In some embodiments, the warning board 70 may include a warning display 71 and a warning light 72.

The controller 52 can change the frequency of the electromagnetic wave transmitted by the wireless transceiver 51, and disconnect the communication between the speed bump 100 and the warning board 70, and continue to realize a wireless communication of the speed bump 100 with another external warning device (which may be integrated in a vehicle) to warn of the location of the speed bump 100. At the same time, the controller 52 of the speed bump 100 can continue to monitor the sensor signals, such as the detection signals.

According to some embodiments of the present disclosure, the system may also comprises an external (first) warning device. The external warning device can issue a first warning information when receiving the first communication signal. Specifically, the external warning device may comprise the above-mentioned warning board 70 (see FIG. 2).

Such a speed bump transportation system is particularly suitable for being applied in road intersections and turns, and it can predict vehicles coming from both sides of the road and at corners to reduce traffic accidents. FIG. 2 shows the installation position of the speed bump 100 for "smart city". The speed bump 100 and the warning board 70 are respectively placed on two intersecting roads. When a car on a road passes over the speed bump 100, the warning board 70 on the other road starts a warning function to warn the drivers: "Attention, vehicle coming in front, please slow down". Thus, traffic accidents at the road intersections or corner due to blind spots can be reduced.

In some embodiments, a second detection device and a second warning device are also included. The second detection device is used for detecting the brightness of the ambient light and sending a second detection signal to the communication device 50 when the light brightness is below a certain threshold. When the communication device 50 receives the second detection signal, it controls the second warning device to issue the second warning information. In some specific implementations, the second detection device may be a light-controlled switch, and the second warning device may be a warning light such as the warning light 72. In this way, the warning light can be automatically turned on at the night, thereby warning the driver of the position of the speed bump 100. In the example shown in FIG. 1, both the second detection device and the second warning device are indicated by a reference number 60.

Figure 3:
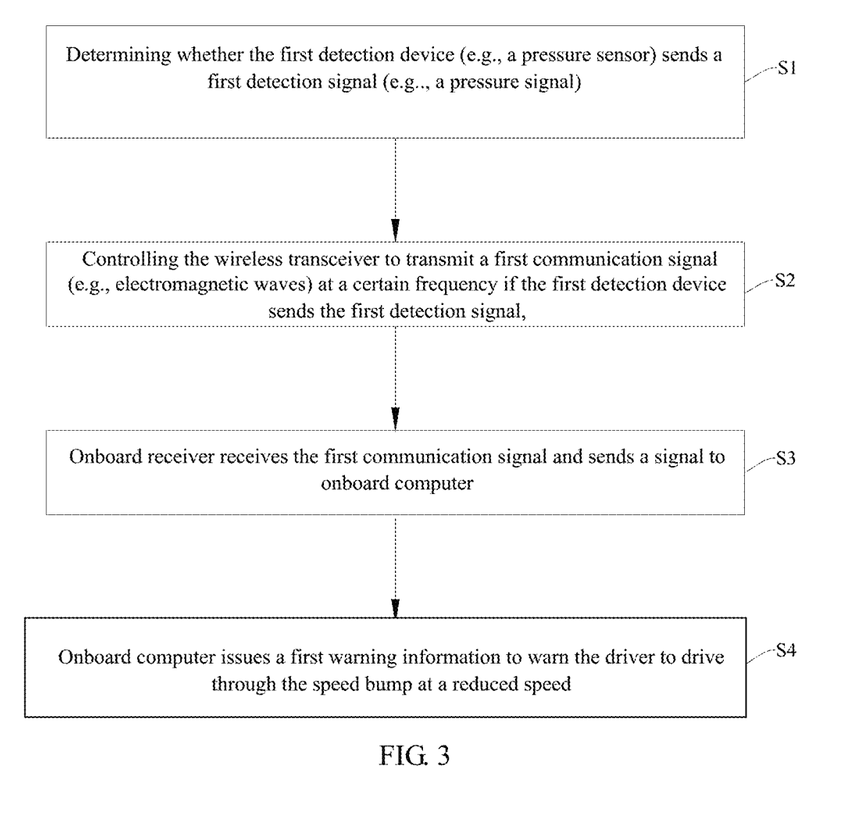
FIG. 3 is a schematic diagram of an operation process of a speed bump according to some embodiments of the present disclosure.

In some embodiments, as shown in FIG. 3, in the case where the external warning device is integrated on the vehicle, the operation steps of the speed bump 100 when the vehicle passes the speed bump 100 are as follows:

S1: It is determined whether the first detection device 40 (e.g., a pressure sensor) sends a first detection signal (e.g., a pressure signal). In some specific implementations, the controller 52 of the speed bump 100 monitors in real time whether the first detection device 40 sends the first detection signal. When the vehicle passes the speed bump 100, the wheel presses the cover 20 of the speed bump 100. At this time, the pressure sensor is triggered and sends a first detection signal to the controller 52 of the speed bump 100.

S2: If the first detection device 40 sends out the first detection signal, the wireless transceiver 51 is controlled to transmit a first communication signal (such as, electromagnetic waves) at a certain frequency. In some specific implementations, the frequency range of the electromagnetic wave emitted by the first detection device 40 at this time is at least partially overlay with the frequency range of the electromagnetic wave that can be received by the vehicle-mounted (also termed as onboard) receiver on the vehicle, so as to ensure that when the current vehicle or the subsequent vehicle can communicates with the speed bump 100 when passes the speed bump 100 or is approaching the speed bump.

S3: The onboard receiver receives the first communication signal and sends a signal to the onboard computer. In some specific implementations, the onboard receiver receives electromagnetic waves in the corresponding frequency range and sends a signal to a control element of the on-board computer.

S4: The on-board computer issues a first warning information to warn the driver to drive through the speed bump 100 at a reduced speed. For example, the control element of the on-board computer controls the speaker to make the following sound: "There is speed bump nearby (or approaching), please slow down". In some specific implementations, the control element of the onboard computer controls a speaker or speaker of the onboard computer to issue a warning sound to warn the driver to slow down.

Figure 4:
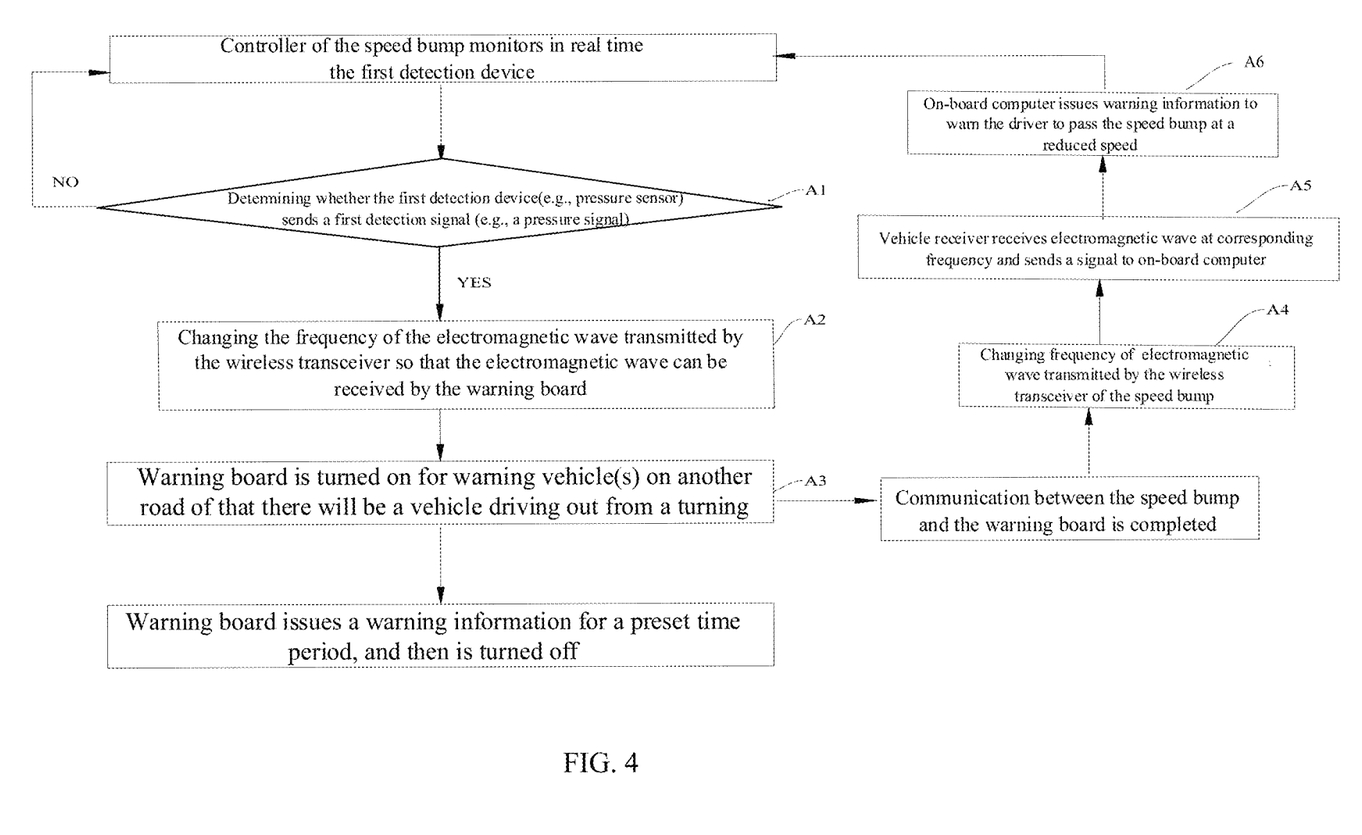
FIG. 4 is a schematic diagram of an operation process of a speed bump according to some other embodiments of the present disclosure.
Figure 5:
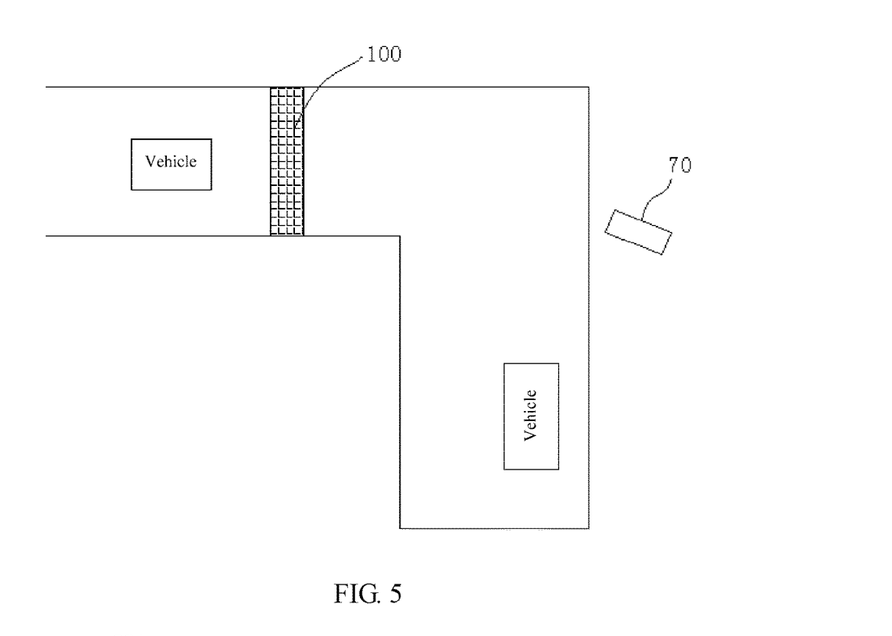
FIG. 5 is a schematic view of an application of a speed bump according to some embodiments of the present disclosure.

In some embodiments, as shown in FIG. 4 and FIG. 5, the process of communication between the speed bump 100 and the warning board 70 when the vehicle passes the speed bump 100 is as follows:

A1: It is determined whether the first detection device 40 (for example, a pressure sensor) sends a first detection signal (i.e., a pressure signal).

A2: If the first detection device 40 sends the first detection signal, the frequency of the electromagnetic wave transmitted by the wireless transceiver 51 is changed so that the electromagnetic wave transmitted by the wireless transceiver 51 can be received by the warning board 70, thus the speed bump 100 and the warning board 70 can conduct wireless communication. The warning board 70 may be provided on the same road as or a different road from the speed bump 100. For example, the road on which the warning board 70 is located may form a road intersection with the road where the speed bump 100 is located.

A3: The warning board 70 is turned on for warning. For example, a vehicle on another road may be warned that there will be a vehicle driving out from a turning/fork. The on-time during which the warning board 70 is turned on can be set according to needs, so that the board can be turned off automatically after having been turned on for a period of time.

A4: After the communication between the speed bump 100 and the warning board 70 is completed, the frequency of the electromagnetic wave transmitted by the wireless transceiver 51 of the speed bump 100 is changed, so that the electromagnetic wave transmitted by the wireless transceiver 51 can be received by an onboard receiver of a vehicle (for example, the vehicle coming afterwards).

A5: The vehicle receiver receives the electromagnetic wave of the corresponding frequency and sends a signal to the on-board computer.

A6: An on-board computer of the vehicle issues a warning information to warn the driver to pass the speed bump 100 at a reduced speed. For example, the control element of the on-board computer controls the speaker to make the following sound: "There is a speed bump nearby, please slow down."

It should be understood that, when the frequency ranges of the electromagnetic waves that can be received by the vehicle-mounted receiver and the warning board 70 match, the wireless transceiver 51 of the speed bump 100 can simultaneously communicate with the vehicle-mounted receiver and the warning board 70, so that the vehicle and the warning board 70 can issue corresponding warning information to warn the driver of the vehicle to slow down while to warn the vehicle on the other road to watch out that there will be a vehicle nearby or approaching.

Of course, the present disclosure shall not be limited to this. When the frequency ranges of the electromagnetic waves that can be received by the vehicle-mounted receiver and the warning board 70 do not match, the default frequency of the electromagnetic wave transmitted by the wireless transceiver 51 of the speed bump 100 can match the frequency of the on-vehicle receiver, or can be consistent with that of the warning board 70. Thus, the wireless transceiver 51 of the speed bump 100 can communicate with one of the warning board 70 and the onboard receiver first, then change the frequency of the electromagnetic wave transmitted by itself and communicate with the other one of the warning board 70 and the onboard receiver.

In summary, with the speed bump traffic system as above-described, communications of the speed bump 100 with an external warning device which can be integrated on an external vehicle or a warning board can be achieved, thus the speed bump 100 becomes a link of a smart city traffic system.

The electric-power generation device 30 of the speed bump 100 according to some embodiments of the present disclosure is described in detail below with reference to FIGS. 6 to 8.

According to another embodiment of the present disclosure, the electric-power generation device 30 comprises a first transmission mechanism 31, a second transmission mechanism 32, an energy storage member, and an electric-power generator 34.

The first transmission mechanism 31 comprises a moving member and a rotating member. The moving member is coupled to the cover 20, and the rotating member is rotatably provided on the base 10. The moving member is adapted to cooperate with (for example, mate with) the rotating member to convert the displacing movement of the moving member into a rotational motion of the rotating member. In an embodiment, the power output member is rotatable and cooperated with (for example, mated with) the rotating member.

The second transmission mechanism 32 comprises a power input member, a transmission shaft 322, a first overrun clutch 323, a second overrun clutch 325, and a power output member. The power input member is coupled to the rotation member. The transmission shaft 322 is rotatably disposed on the base 10. The first overrun clutch 323 is disposed between the power input member and the transmission shaft 322, and couples the power input member and the transmission shaft 322 when the transmission shaft 322 is rotated in a first direction. The second overrun clutch 325 is disposed between the power output member and the transmission shaft 322, and couples the power output member and the transmission shaft 322 when the transmission shaft 322 rotates in a second direction.

The energy storage member is coupled to the transmission shaft 322. In some implementations, the energy storage member is configured to store energy when the transmission shaft 322 rotates in the first direction and releases energy when the transmission shaft 322 rotates in the second direction.

The electric-power generator 34 is coupled to the power output member.

The first overrun clutch 323 and the second overrun clutch 325 are members for power transmission and separation between a driving shaft and a driven shaft. They are devices having self-clutching function on basis of the change of the speeds of the driving and driven portions or the change of the rotation directions.

Thus, when the first overrun clutch 323 couples (clutches) and the second overrun clutch 325 dis-couples (does not clutch), the force to press the cover 20 down is sequentially transmitted to the energy storage member through the first transmission mechanism 31 and the second transmission mechanism 32 and the energy thereof is stored in the energy storage. When the energy is to be released, the second overrun clutch 325 couples and the first overrun clutch 323 dis-couples. At this time, the energy storage member outputs the mechanical energy to the electric-power generator 34 through the transmission shaft 322 and the power output member. Thereby stable input of energy to the electric-power generator 34 can be achieved and the electric-power generation efficiency can be improved.

In summary, the electric-power generation device 30 of the speed bump 100 provides electric power to the traffic system. With a simple mechanical structure thereof, the kinetic energy and potential energy originated from the vehicle passing through the speed bump 100 are converted into electrical energy and stored. The electric-power generation device 30 solves such a defect of the electric-power generation system of the prior-art speed bump that it has complex structure and complex principle, and is capable of maximally utilizing the energy of the vehicle passing over the speed bump 100.

In some embodiments, the energy storage member is a scroll spring 33. When the scroll spring 33 reaches the maximum tightened state, the first overrun clutch 323 automatically di s-couples the power input member and the propeller shaft 322, and the second overrun clutch 325 automatically couples the power output and transmission shaft 322. One end of the scroll spring 33 is fixed to the transmission shaft 322, and the other end is fixed to the base 10. The scroll spring 33 may be configured so that its elastic modulus k1 is large because it functions as an energy storage element. The larger k1 is, the greater the mechanical energy stored by the scroll spring 33 is.

Thus, when the scroll spring 33 reaches the maximum tightening state (i.e., when the amount of contraction is maximum), the states of the first overrun clutch 323 and the second overrun clutch 325 are changed, and at this time, the scroll spring 33 can be automatically switched from the store energy mode to the release energy mode without needs of external hydraulic components or electronic control components, and the structure thereof is simplified and the operation is more convenient.

In some embodiments, the shaft 322 implements a rotational motion, and it may be coupled to the plate 403 through, for example, a double direction angular contact thrust ball bearing 401. The plate 403 may be fixed to the speed bump lower plate 103 by bolts (not shown).

Figure 7:
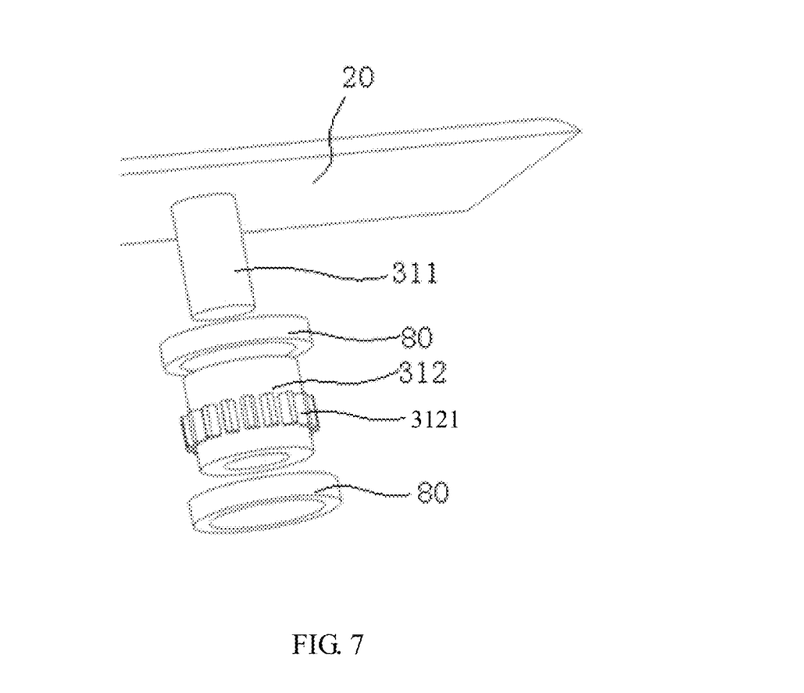
FIG. 7 is a schematic diagram of a first transmission mechanism of an electric-power generation device of a speed bump according to some embodiments of the present disclosure.

In some implementations, as shown in FIG. 7, the first transmission mechanism 31 is a ball screw transmission mechanism. The ball screw drive mechanism may comprise a screw rod 311 and a nut 312 which are driven through screw thread, and ball(s). Power can be transmitted between the screw rod and the nut by means of the screw thread. For example, the screw rod can drive the nut by a screw thread. The screw rod 311 acts as a moving member and the nut 312 acts as a rotating member.

As a result, the downwardly-pressed linear motion is converted into rotational motion by the ball screw mechanism, and the transmission is more stable and reliable. In addition, both the nut 312 and the base 10, the transmission shaft 322, and the base 10 may be coupled via an angular contact ball bearings 80.

Figure 6:
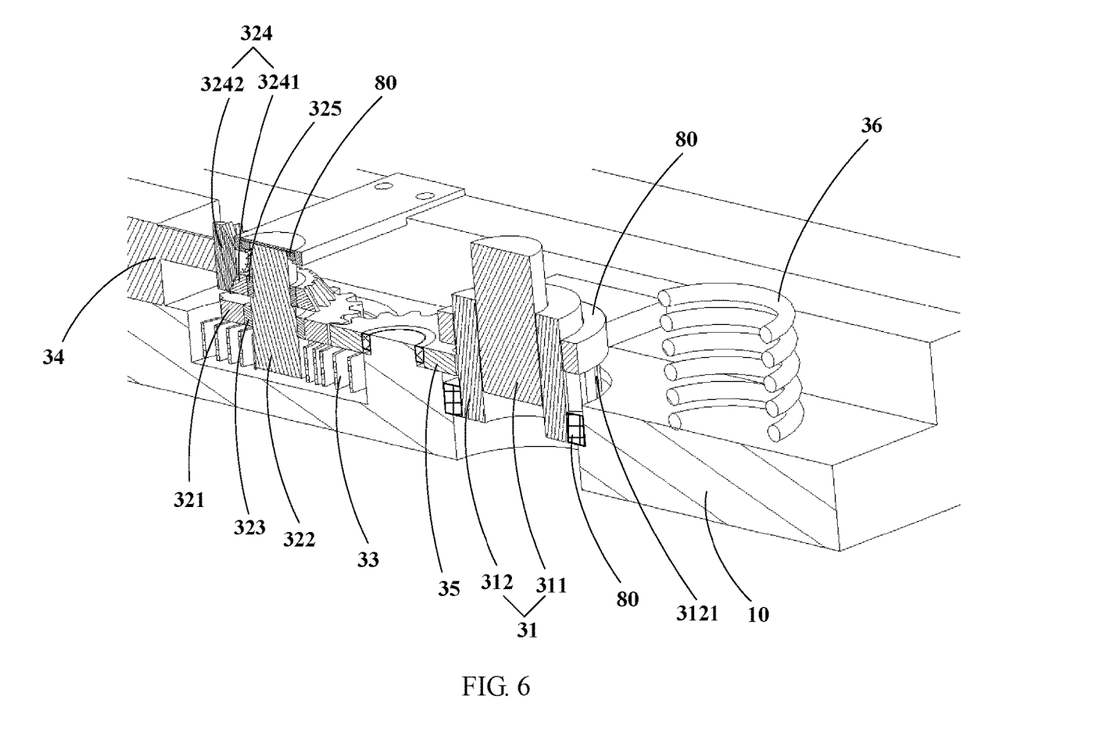
FIG. 6 is a schematic cross-sectional view of an electric-power generation device of a speed bump according to some embodiments of the present disclosure.
Figure 8:
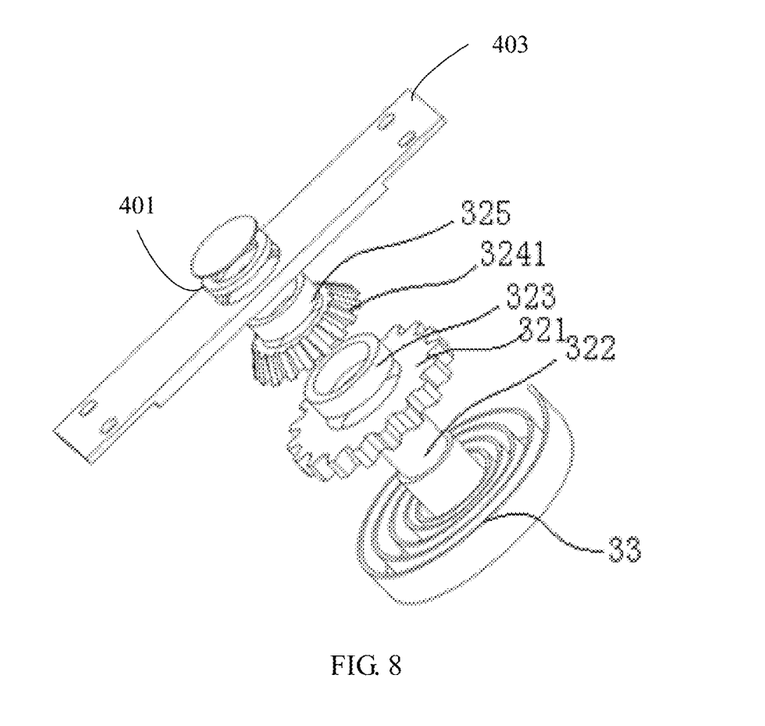
FIG. 8 is a schematic diagram of a second transmission mechanism of a speed bump according to some embodiments of the present disclosure.

In some implementations, as shown in FIG. 6 and FIG. 8, the power input member is a first straight gear 321; the outer wall of the rotating member is provided with a gear tooth portion 3121, and the gear tooth portion 3121 is engaged with the first straight gear 321 through a second straight gear 35 pivotally coupled to the base 10; the power output member is a bevel gear transmission group or a bevel gear set 324. The bevel gear transmission group 324 comprises a first bevel gear 3241 and a second bevel gear 3242 that are meshed with each other. The first bevel gear 3241 is coupled to the transmission shaft 322 via the second overrun clutch 325, and the second bevel gear 3242 is coupled to the electric-power generator 34. Thus, the rotation shaft or the rotor of the electric-power generator can be driven by the second bevel gear 3242 to generate electric power. The generated electricity can be stored in a battery.

In some specific implementations, the first straight gear 321, the second straight gear 35, the first overrun clutch 323, the rotating shaft, and the scroll spring 33 constitute a scroll spring tightening system to achieve energy storage. The bevel gear, the overrun clutch, the transmission shaft 322, and the scroll spring 33 constitute a mechanical energy release system, and the electric-power generator 34 is driven by the gear(s) to generate electricity and store electrical energy.

In an embodiment, the speed bump 100 may further comprise a reset member 36 coupled between the cover 20 and the base 10 and configured to reset the cover 20 to a position away from the base 10. In some implementations, the reset member 36 may be configured to always push the cover 20 away from the base 10. That is, the reset member 36 may be configured to have a tendency to push the cover 20 away from the base 10. In other words, the force applied by the reset member 36 to the cover 20 always pushes the cover 20 toward the direction away from the base 10, so that the cover 20 returns to the initial position.

In some implementations, the reset member 36 may be a return spring. The return spring may be a compression spring located between a lower end of the cover 20 and the base 10 so that the elastic restoring force of the compression spring can reset the cover 20 after the vehicle (or the tyres or the like) leaves the cover 20.

In the embodiments of the present disclosure, the scroll spring 33 serves to store the kinetic energy and potential energy from the vehicle passing over the speed bump 100. And the larger the elastic modulus k1 thereof is, the more energy is stored. The elastic modulus k2 of the return spring can be configured to be relatively small, and is not used as an energy storage element, but to reset of the cover 20. The reason why the scroll spring 33 is not used for resetting is that the elastic modulus k1 of the scroll spring 33 may be very large, and there may be a large force imposed on the vehicle in the process of releasing energy, which might affect the safety of the vehicle. Thus, the return spring with a small elastic modulus is selected to reset the cover. In addition, during the release of the elastic energy of the scroll spring 33, the transmission shaft 322 is dis-coupled from the first permanent gear 321 by the second overrun clutch 325, thereby ensuring the safety of driving.

In an embodiment, the scroll spring 33, the power input member, and the power output member are sequentially disposed along the axial direction of the transmission shaft 322, and an end of the transmission shaft 322 facing away from the scroll spring 33 is pivotally coupled to the base 10 through a bearing. As a result, the structure of the electric-power generation device 30 can be more compact and the power transmission is more stable.

An operations of a charging system of the speed bump 100 according to some embodiments of the present disclosure will be described in detail below with reference to FIGS. 6 and 7.

When a vehicle passes the speed bump 100, the cover 20 is pressed down. In this case, the linear motion is converted into rotational motion by the first transmission mechanism 31 and transmitted to the first gear and the second gear. The second gear drive the transmission shaft 322 to rotate, and causes the scroll spring 33 to be quickly tightened to store the kinetic energy and gravitational potential energy.

Then, when the scroll spring 33 reaches the maximum tightened state, the first overrun clutch 323 separates the second gear from the transmission shaft 322; the spring releases energy quickly. The rotation direction of the transmission shaft 322 is changed, and thus the second overrun clutch 325 couples the first bevel gear 3241 and the transmission shaft 322, the first bevel gear 3241 is rapidly rotated, and drives the electric-power generator 34 through the second bevel gear 3242 to generate electricity.

After the scroll spring 33 releases energy, the transmission shaft 322 stops rotating, and the first bevel gear 3241 continues to rapidly rotate due to the release of elastic energy and inertia. The rotation speed of the first bevel gear 3241 and the transmission shaft 322 is changed, and the second overrun clutch 325 dis-couples the first bevel gear 3241 and the transmission shaft 322. At this point, the transmission shaft 322 is ready for the next tightening of the spring.

After the vehicle (or, tyres or the like) leaves the speed bump 100, the cover 20 and the transmission shaft 322 are lifted upward by the reset member 36. Due to the change of the rotation direction, the first overrun clutch 323 separates the transmission shaft 322 from the first gear, thereby achieving the separation of the two transmission mechanisms. Thus, the cover 20 of the speed bump 100 moves independently during the reset process.

According to a further embodiment, the gear 35 may also be directly coupled to an electric-power generator (such as but not limited to a rotating shaft of the generator), so that the electric-power generator can be driven by the gear 35 to rotate to generate electricity.

In the description of the present disclosure, it is to be understood that the orientation or positional relationship indicated by the terms "center", "longitudinal", "transverse", "length", "width", "thickness", "on", "below", "front", "rear", "left", "right", "vertical", "horizontal", "top", "bottom", "inner", "outer", "clockwise", "counterclockwise", "axial", "radial", "circumferential", etc., are based on the orientations or positional relationships shown in the drawings, and is merely for facilitating the description of the present disclosure and simplifying the description. The orientation or positional relationship indicated by any of these terms is not used to indicate or suggest the related structure or element necessarily have a particular orientation or be constructed and operated in a particular orientation, and therefore should not be construed as a limit to the present disclosure. In addition, the features leaded by "first", "second", etc. may explicitly or implicitly indicate that there can be one or more of the features. In the description of the present disclosure, the term "plurality" means two or more unless otherwise specified.

In the present specification, the descriptions referring to the terms "embodiment(s)", "some embodiments", "illustrative embodiment(s)", "example(s)", "specific example(s)", or "some examples" and the like is meant to that the specific feature(s), structure(s), material(s), or characteristics, or the like described referring to the embodiment(s) or example(s) can be included in at least one embodiment or example of the present disclosure. In this specification, the schematic representations of referring to the above terms do not necessarily mean referring to the same embodiment(s) or example(s). Moreover, the particular features, structures, materials, or characteristics described can be combined in any suitable manner in one or more embodiments or examples.

Although embodiments of the present disclosure have been illustrated and described, it will be apparent to those of ordinary skill in the art that various changes, modifications, substitutions, and variations can be made to these embodiments without departing from the principles and spirit of the present disclosure. The scope of the present disclosure shall be defined by the claims and their equivalents as below.

What is claimed is:

1. A speed bump comprising:
   a base;
   a cover disposed opposite to the base and configured to be movable relative to the base;
   an electric-power generation device associated with the cover to scavenge energy through the cover and convert the energy into electrical energy;
   a first detection device for detecting a force condition of the cover and sending a first detection signal to a communication device when the cover is pressed;
   the communication device electrically connected to the first detection device and for sending a first communication signal when receiving the first detection signal,
   wherein the electric-power generation device is electrically connected to the communication device and the first detection device respectively to supply electric-power to the communication device and the first detection device,
   wherein the electric-power generation device comprises:
   a first transmission mechanism comprising a moving member and a rotating member, the moving member being coupled to the cover, the rotating member being rotatably disposed on the base, and the moving member being mated with the rotating member to convert a displacing movement of the moving member into a rotational movement of the rotating member;
   a second transmission mechanism comprising:
   a power input member coupled to the rotating member;
   a transmission shaft rotatably disposed on the base;
   a first overrun clutch disposed between the power input member and the transmission shaft, and coupling the power input member and the transmission shaft when the transmission shaft is rotated in a first direction;
   a power output member; and
   a second overrun clutch disposed between the power output member and the transmission shaft, and coupling the power output member and the transmission shaft when the transmission shaft is rotated in a second direction;
   an energy storage member coupled to the transmission shaft, and storing energy when the transmission shaft is rotated in the first direction and releasing energy when the transmission shaft is rotated in the second direction; and
   an electric-power generator coupled to the power output member.

2. The speed bump according to claim 1, wherein the communication device comprises a wireless transceiver for transmitting the first communication signal.

3. The speed bump according to claim 2, wherein the wireless transceiver is adapted for one of the following:
   sending one piece of the first communication signal;
   sending, simultaneously, a plurality of the first communication signals; or
   sending a plurality of the first communication signals in sequence.

4. The speed bump according to claim 2, wherein the speed bump further comprises a second detection device and a second warning device,
   wherein the second detection device is configured to detect a brightness of ambient light and send a second detection signal to the communication device when the brightness is below a threshold, and
   wherein the communication device controls the second warning device to issue a second warning information when receiving the second detection signal.

5. The speed bump according to claim 1, wherein
   the energy storage member is a scroll spring,
   when the scroll spring reaches a maximum tightened state, the first overrun clutch automatically dis-couples the power input member and the transmission shaft, and the second overrun clutch automatically couples the power output member and the transmission shaft.

6. The speed bump according to claim 1, wherein the first transmission mechanism is a ball-screw transmission mechanism comprising a screw rod, a nut, and a ball, wherein the screw rod is configured to drive the nut by a screw thread, wherein the screw rod functions as the moving member and the nut functions as the rotating member.

7. The speed bump according to claim 1, wherein
   the power input member is a first straight gear, and an outer wall of the rotating member is provided with a gear tooth portion which is meshed with the first straight gear through a second straight gear pivotally coupled to the base;

the power output member is a bevel gear transmission group comprising a first bevel gear and a second bevel gear meshed with each other, the first bevel gear and the transmission shaft are capable of being coupled by the second overrun clutch, and the second bevel gear is coupled to the electric-power generator.

8. The speed bump according to claim 5, wherein the first transmission mechanism is a ball screw transmission mechanism comprising a screw rod, a nut, and a ball, wherein power is transmitted between the screw rod and the nut though a screw thread, the screw rod functions as the moving member, and the nut functions as the rotating member.

9. The speed bump according to claim 5, wherein
the power output member is a third straight gear, an outer wall of the rotating member is provided with a gear tooth portion which is meshed with the third straight gear.

10. The speed bump of claim 1, further comprises a reset member coupled between the cover and the base and configured to reset the cover to a position away from the base.

11. A system comprising a speed bump according to claim 1.

12. The system according to claim 11, further comprising a first warning device disposed outside the speed bump, the first warning device issuing first warning information upon receipt of the first communication signal.

* * * * *